United States Patent [19]

Furuyama et al.

[11] Patent Number: 4,670,226
[45] Date of Patent: Jun. 2, 1987

[54] REACTOR OF MOVING BED TYPE

[75] Inventors: Kuninori Furuyama, Tochigi; Yoshiro Ito, Tokyo, both of Japan

[73] Assignees: Mitsui Mining Company, Limited; Mitsui Miike Engineering Corp., both of Tokyo, Japan

[21] Appl. No.: 721,067

[22] Filed: Apr. 8, 1985

[51] Int. Cl.⁴ ............................................. B01D 53/06
[52] U.S. Cl. ........................................ 422/216; 55/77; 55/390; 55/474; 55/516; 55/518; 422/177; 422/178
[58] Field of Search .................... 422/216, 177, 178; 55/390, 474, 479, 484, 516, 518, 519, 77

[56] References Cited

U.S. PATENT DOCUMENTS 3,708,981  1/1973  Johswich et al. ................. 55/390
3,716,969  2/1973  Maeda ................................ 55/390
4,333,751  6/1982  Iwamura et al. ................. 422/216

FOREIGN PATENT DOCUMENTS 57468   8/1982  European Pat. Off. ............ 55/390
381500  5/1924  Fed. Rep. of Germany ........ 55/474
216675  6/1924  United Kingdom ................ 55/474
904746  2/1982  U.S.S.R. ............................ 55/474

Primary Examiner—Michael S. Marcus
Assistant Examiner—William R. Johnson
Attorney, Agent, or Firm—Wenderoth, Lind & Ponack

[57] ABSTRACT

A reactor of the moving bed type wherein a granular material is packed and held by a louver structure and moved downward and brought into contact with a gas passing through the louver, is improved so as to avoid both accumulation of dust on the louver part at the gas inlet side and excessive rising of the pressure loss. The improvement consists of providing a sub-louver comprising louver units each having a cross section of reverse V-type, including triangular type, inside a main louver for packing and holding the granular material in such a manner that the sub-louver is aligned in parallel with the main louver, the louver unit of the sub-louver has a vertex positioned at an intermediate height between the louver boards of the main louver, one side of the V-type of the sub-louver is directed toward the inside of the main louver in a reverse gradient to the main louver, the other side of the V-type is directed downward in the vertical or inclined direction from the vertex, and the lower end of each of the sides does not contact the vertex of the next lower sub-louver unit.

11 Claims, 16 Drawing Figures

REACTOR OF MOVING BED TYPE

BACKGROUND OF THE INVENTION

1. Field of the Invention

This invention relates to a reactor of moving bed type wherein various reactions and adsorptions for the removal of dusts, SOx and NOx are carried out by contacting a gas such as waste gases containing SOx and NOx passing through a louver with a granular material such as carbonaceous adsorbents supported by the louver and moved downward.

2. Description of the Prior Art

Figure 1:
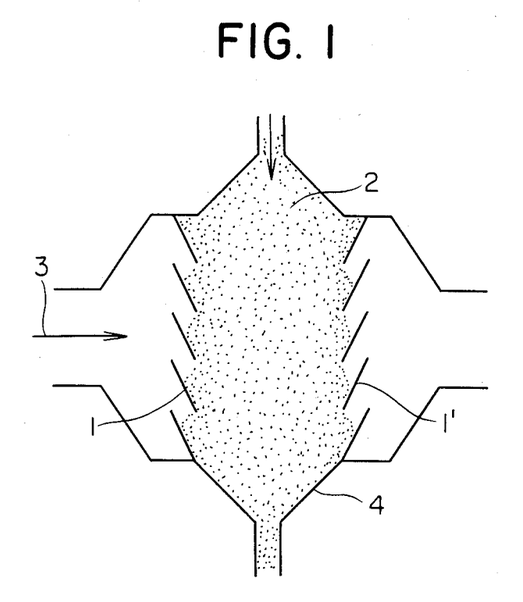
FIG. 1 is a cross-sectional view of a moving bed reactor in which a granular material is held by the prior art louver.

In an apparatus of this type, as shown in FIG. 1 of the prior art, granular material 2 is packed and held by a pair of louvers 1 and 1' arranged vertically and is moved downward to form a moving bed, while gas 3 is introduced into reactor 4, passed transversely through the moving bed via louver 1 to effect dust removal and reactions, and then discharged from louver 1' on the opposite side. However, such a reactor has hitherto met with the following problems.

Figure 2:
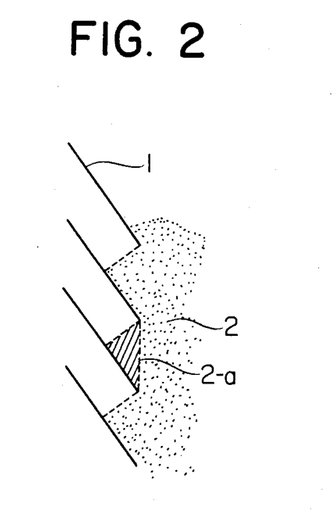
FIG. 2 is a partially enlarged view of the vincinity of the louver in the moving bed reactor of the prior art shown in FIG. 1.

The first problem is that the non-moved part 2-a of granular material 2 is formed on louver 1 as shown in FIG. 2 and accordingly, in the case of feeding a gas with a high dust concentration, a layer of dust grows at the gas inlet side of non-moved layer 2-a, resulting in increase of the pressure loss. In addition, non-moved layer 2-a reaches a saturation in chemical reactions and chemical products come out of non-moved layer 2-a which often corrode the louver and decrease the whole reaction capacity.

Figure 3:
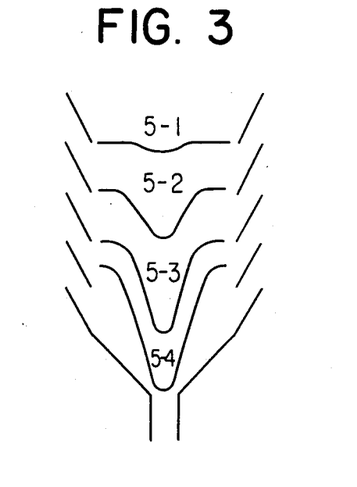
FIG. 3 and FIG. 4 are schematic views each showing the flow rate distribution of a granular material in the moving bed reactor of this kind.
Figure 4:
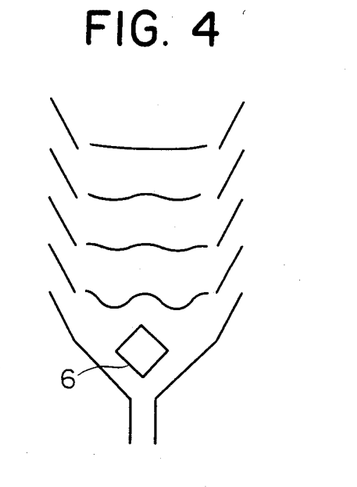

Secondly, the exhaust port of granular material 2 in the reactor is ordinarily contracted more narrowly than the gap of louvers 1 and 1' as shown in FIG. 3 and when operated as such, the velocity distribution of the granular material in the moving bed becomes as shown by patterns 5-1 to 5-4 of FIG. 3. Thus, there has been proposed a method wherein various flow regulations 6 as shown in FIG. 4 are provided so as to make the velocity distribution in the moving bed as uniform as possible. However, it is very difficult to control the moving state of the granular material because of the intrinsic non-uniformity thereof and changes in grain size, dust content. Thus, moisture content with the passage of time and the difficulty cannot be overcome only by the provision of the flow regulator.

From the standpoint of dust removal and reactions, on the other hand, granular material 2 in the moving bed is more loaded, in general, nearer the gas inlet side and subjected to the maximum load near the louver at the gas inlet side. When a reaction product is of a strong adhesiveness, granular material 2 tends to agglomerate at a low moving velocity and grows to increase the pressure loss of a gas. In order to avoid this phenomenon, it is preferable to move and replace the granular material at this site at a relatively higher speed. However, the prior art method has no countermeasure and leaves the material alone and unchecked and cannot freely control the moving velocity at the site.

SUMMARY OF THE INVENTION

It is an object of the present invention to provide a reactor of the moving bed type, whereby the above described disadvantages can be overcome.

It is another object of the present invention to provide a moving bed reactor in which a granular material is prevented from remaining on a louver but is kept in a good moving state to avoid accumulation of dust on the louver part at the gas inlet side and excessive rising of the pressure loss.

It is a further object of the present invention to provide a moving bed reactor capable of controlling the moving velocity of a granular material at the gas inlet side subjected to a higher load with checking the pressure loss.

These objects can be attained by a reactor of moving bed type wherein a granular material is packed and held by a louver structure, moved downward and brought into contact with a gas passing through the louver, characterized in that a sub-louver comprising louver units each having a cross section of reverse V-type is provided inside a main louver for packing and holding the granular material in such a manner that the sub-louver is aligned in parallel with the main louver, the louver unit has a vertex positioned at an intermediate height between the louver boards of the main louver, one side of the V-type of the sub-louver is directed toward the inside of the main louver in are verse gradient to the main louver, the other side of the V-type is directed downward in the vertical direction from the vertex, or in an outwardly inclined direction with an angle of at most 10 degrees nd the lower end of each of both the sides is not contacted with the vertex of the next lower sub-louver.

BRIEF DESCRIPTION OF THE DRAWINGS

The accomanying drawings are to illustrate the principle and merits of the present invention in greater detail.

DETAILED DESCRIPTION OF THE INVENTION

We, the inventors, have made various efforts to overcome the disadvantage of the prior art and consequently, have reached the present invention. In a reactor of moving bed type wherein a granular material is packed and held by a louver structure, moved downward and brought into contact with a gas passing through the louver according to the present invention, a sub-louver comprising a number of louver units each having a cross-section of reverse V-type is provided inside a main louver for packing and holding the granular material in such a manner that the sub-louver is aligned in parallel with the main louver, each of the louver units having a vertex positioned at an intermediate height between the louver boards of the main louver, one side of the V-type of the sub-louver being directed from the vertex toward the inside of the main louver in a reverse gradient to the main louver, the other side of the V-type directed from the vertex downward in the vertical direction, or in an inclined direction with an angle of 10 degrees or less and the lower end of each of the both sides does not contact the vertex of the next lower sub-louver.

The most important feature of the reactor of moving bed type according to the present invention is that a granular material is prevented remaining on louver boards but is held in a good moving state to avoid both the accumulation of dust on the louver boards at the gas inlet side and excessive rising of the pressure loss. In a preferred embodiment of the present invention, in particular, the ratio of the moving speed of a granular material in the vicinity of the louver and that of another granular material in the other part is freely varied without varying the flow rate of the granular material in the whole of the reactor, whereby the moving speed of the granular material at the gas inlet side, subjected to a higher load, is controlled by checking the pressure loss.

Figure 5:
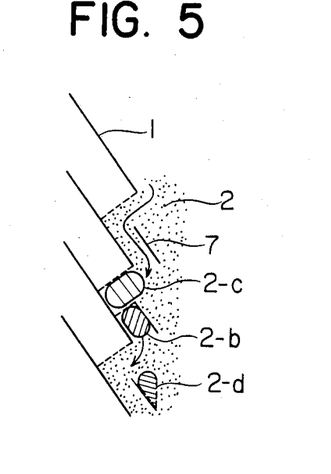
FIG. 5 is a partially enlarged view of the vicinity of the louver showing the position and structure of a sub-louver of the prior art.

The present invention will further be illustrated in detail by the accompanying drawings. Referring to FIG. 2, non-moved part 2-a of granular material 2 is formed due to the fact that the side pressure from inside on part 2-a and the side pressure by the own weight of part 2-a are balanced. If the side pressure acting from inside can be intercepted by some method so that it will not act directly on part 2-a, therefore, the granular material of part 2-a is discharged downward and by way of compensation, a new granular material is then fed thereto from the upper part, a continuous replacement thus being carried out. For this purpose, a method has been proposed as shown in FIG. 5 in which sub-louver 7 is provided near main louver 1 in such a manner that the louver board of sub-louver 7 is positioned at the same gradient as that of main louver 1 between the louver boards of main louver 1. According to this method, the side pressure acting from inside on part 2-b of main louver 1 is intercepted or supported by the sub-louver, so that the discharge of the granular material is smoothly carried out from part 2-b and by way of compensation, the granular material of part 2-c is fed to part 2-b, thus replacement of the granular material at main louver 1 being smoothly accomplished. However, this method encounters te similar problem to one degree or another, since new non-moved part 2-d is formed on the sub-louver.

Figure 6:
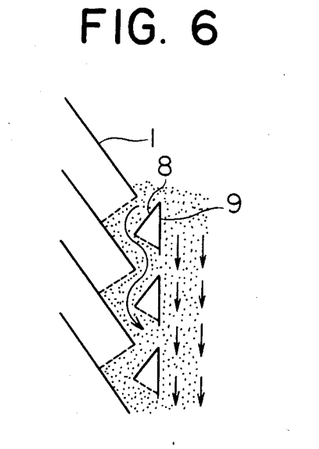
FIG. 6 is a partially enlarged view of the vicinity of the louver showing the position and structure of a sub-louver of the present invention, and the flow of a granular material.

In the present invention, a sub-louver of reverse V-type 8 and 9 without a lower side is provided as shown in FIG. 6, whereby a granular material outside the louver is moved smoothly in a zigzag direction and a granular material inside the louver is smoothly moved downward and vertically along louver board 9, resulting in no remainder of the granular material. Moreover, there is little movement of the granular material through a gap between the adjacent louver boards 9 and 9 and the granular material at the both sides is thus moved as independent flows, so that the granular material moving from the lowermost stage of the louver toward the exhaust port is substantially the same as that entering into the upper-most stage thereof. Preferably, the V-type of the sub-louver has a vertical angle of 30 to 50 degrees.

On the other hand, in order to effect a smooth movement of a granular material near the louver, the flow rate of the granular material extracted from the lowermost stage must of course be secured. The discharge port of a reactor is generally provided at the end of a slope having a downgrade from the lowermost stage of the louver as shown in FIG. 1. The angle of the downgrade of the slope from which granular material 2 is directed to the discharge port in reactor 4 is small and the moving velocity of the granular material near the slope is the lowest in the reactor even if any flow regulator is used. Furthermore, it is impossible to freely control the moving velocity of this part.

Figure 7:
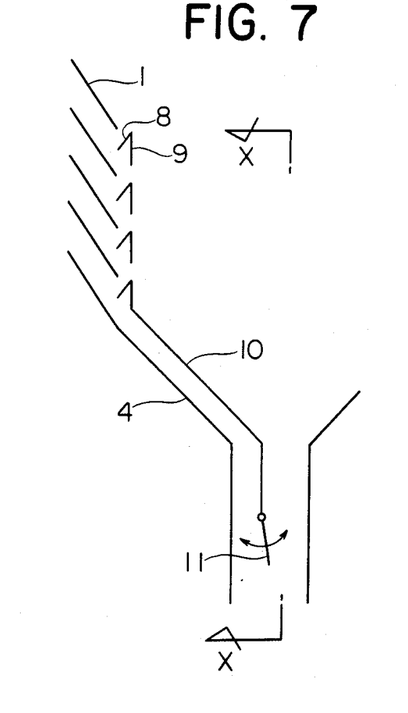
FIG. 7 is a schematic view of one embodiment of the sub-louver according to the present invention.
Figure 8:
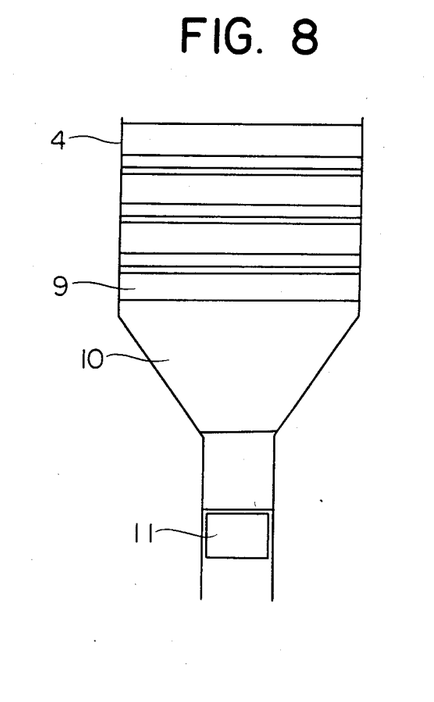
FIG. 8 is a cross-sectional view along line X—X of FIG. 7.

In the preferred embodiment of the present invention, the flow rate of a granular material withdrawn from the lowermost stage of a louver can be secured and controlled at will by providing partition plate 10 from the lower end of vertical louver board 9 at the lowermost stage of the sub-louver to the inside of a discharge nozzle along casing 4 for forming a structure so that the granular materials above and below partition plate 10 are not mixed, as shown in FIG. 7 and FIG. 8 taken along line X—X of FIG. 7. Partition plate 10 is provided at the bottom side thereof with rotary partition plate 11 having a shaft parallel with the bottom side in such a manner that the granular material is not passed through a gap between the bottom side of partition plate 10 and the upper side of rotary partition plate 11. The angle of rotary partition plate 11 can be controlled from outside.

According to the above described structure, the granular material discharged from the lower end of the louver is passed between partition plate 10 and casing 4, reaching the discharge nozzle without interference from the granular material above partition plate 10. In the discharge nozzle, the cross-sectional areas of the left and right outlet parts can be changed by changing the angle of rotary partition plate 11. Even if the whole quantity of material to be discharged remains constant, the ratio of the left and right flow rates can continuously be varied from 0 to infinity by controlling the angle of rotary partition plate 11. Thus, it is possible to effect the moving velocity distribution of the granular material in the reactor without increasing the whole quantity material to be discharged.

In another preferred embodiment, a sub-louver comprises a number of louver units each having a cross-section of reverse V-type triangular form which is closed and whose one side is directed from the vertex toward the inside of the main louver in a reverse gradient to the main louver and other side is directed from the vertex downward in an outwardly inclined direction with an angle of at most 10 degrees, the lower ends of both the sides being out of contact with the vertex of the next lower sub-louver. In this case, a granular material moving downward is prevented from clogging in the open part of the reverse V-type louver unit.

The amount of a granular material moving downward through between the main louver and sub-louver is preferably 5 to 20% of all the granular material, depending on the property of the granular material, the size or form of the reactor and the type gas to be processed.

The following examples are given in order to illustrate the present invention in detail without limiting the same.

EXAMPLES

Figure 9:
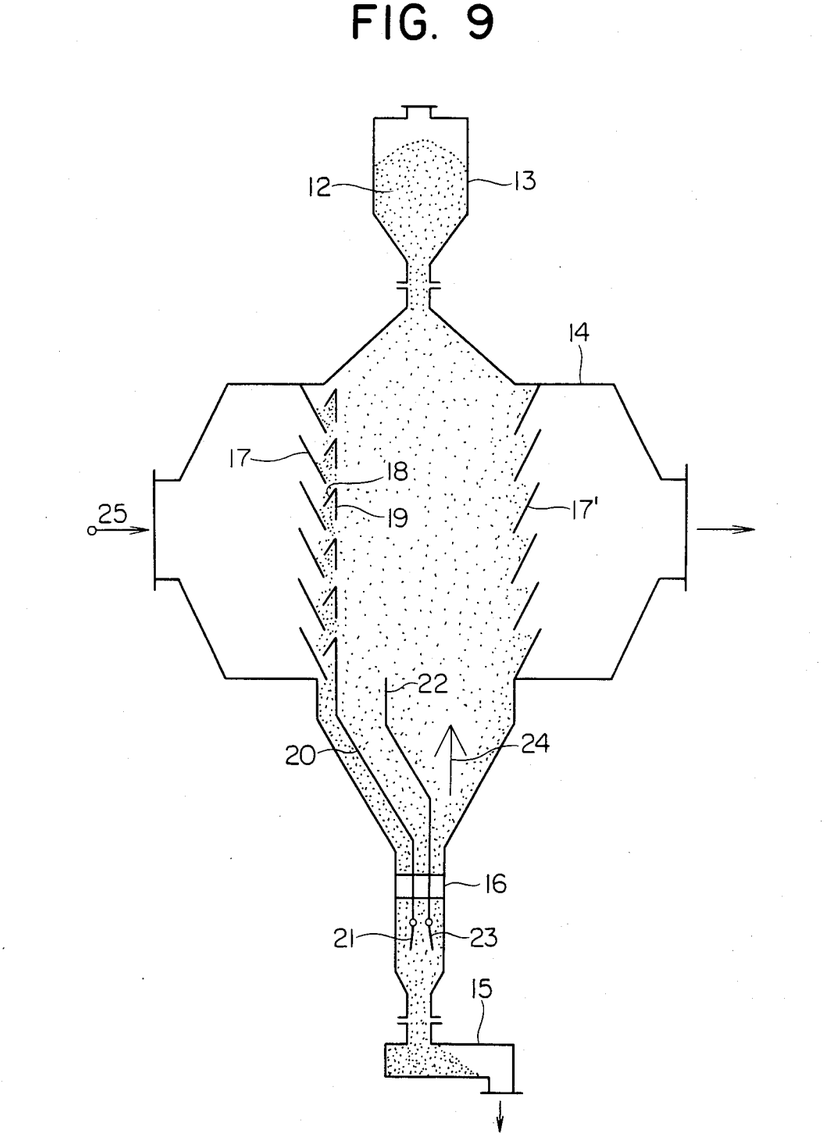
FIG. 9 is a cross-sectional view of one embodiment of the moving bed reactor of the present invention.
Figure 10:
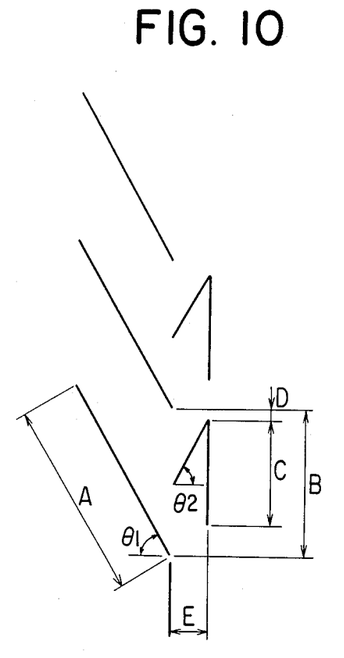
FIG. 10 is a partial cross-sectional view of the sub-louver of the present invention.
Figure 13:
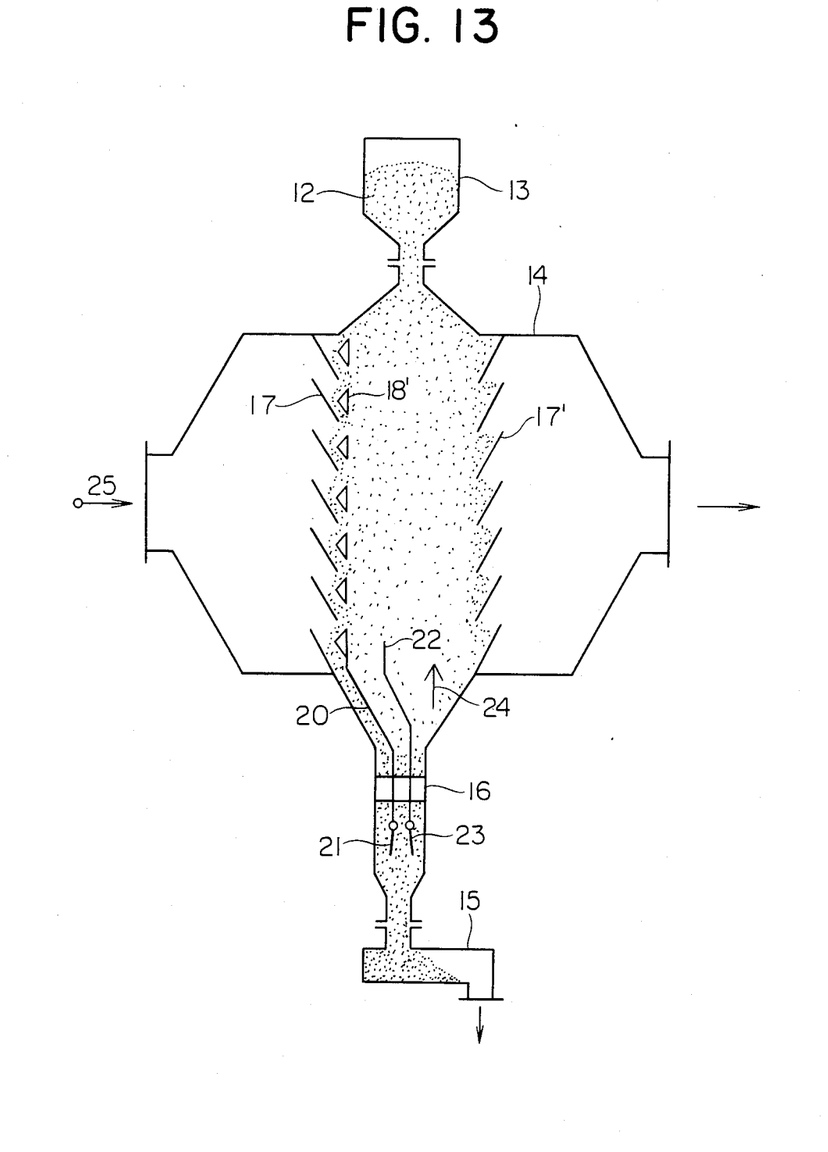
FIG. 13 is a cross-sectional view of another embodiment of the moving bed reactor of the present invention.
Figure 14:
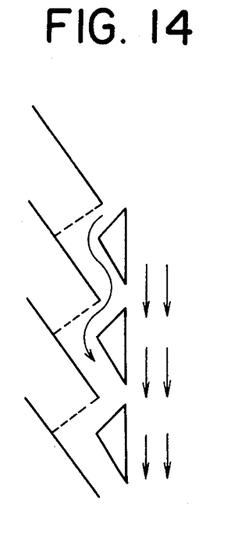
FIG. 14 is a partially enlarged view of the vicinity of the louver showing the position and structure of a triangular type sub-louver of the present invention and the flow of a granular material.
Figure 15:
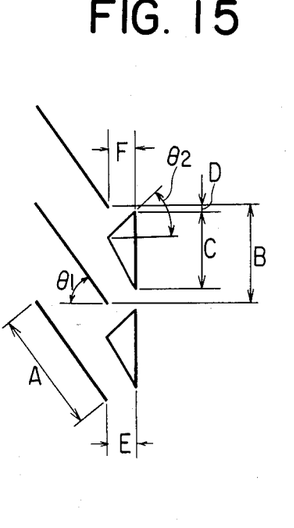
FIG. 15 is a partial view of the triangular type sub-louver of the present invention.

FIGS. 9 and 13 show embodiments of the apparatus for the removal of SOx and NOx by a dry process according to the present invention, using sub-louvers shown in FIG. 10 and FIG. 15. Referring to FIG. 9 and FIG. 13, activated coke 12 with an average grain diameter of about 8 mm$\phi$ is packed in hopper 13 for holding a constant level of granular material, passed is through reactor 14 and is discharged by metering feeder 15. Gas 25 enters reactor 14 from the side thereof, is passed through louvers and activated coke bed where it is subjected for removal of SOx, NOx and dust, and leaves reactor 14 from the opposite side thereof. The activated coke in reactor 14 is held by main louver 17 at the inlet side and louver 17' at the outlet side. Near main louver 17 at the inlet side a sub-louver of reverse V-type 18 and 19 in FIG. 9 and of triangular type 18' in FIG. 13, are provided. Partition plate 20 and rotary partition plate 21 are also provided. In the intermediate portion of the activated coke bed, partition plate 22, rotary partition plate 23 and flow regulator 24 are provided for the purpose of controlling the whole moving velocity distribution. Control of the moving velocity is ordinarily carried out by observing the falling velocity of the activated coke through sight glass 16.

FIG. 10 and FIG. 15 show the details of the sub-louvers at the inlet side. The dimensions of the sub-louvers at the inlet side are summarized below:

|  | $\theta_1$ | $\theta_2$ | A (mm) | B (mm) | C (mm) | D (mm) | E (mm) | F (mm) |
|---|---|---|---|---|---|---|---|---|
| FIG. 10 | 60° | 60° | 400 | 300 | 217 | 20 | 75 | — |
| FIG. 15 | 70° | 50° | 480 | 450 | 350 | 30 | 115 | 100 |

Figure 11:
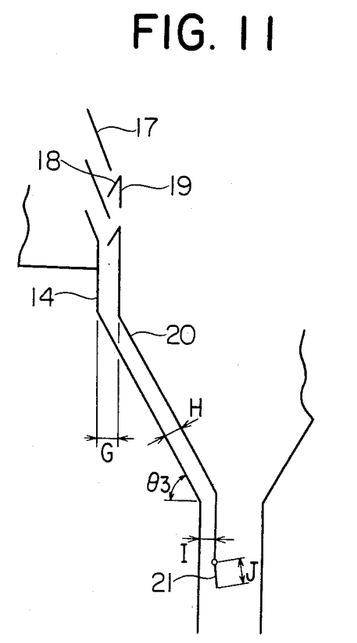
FIG. 11 is a partial cross-sectional view of a partition plate provided to the sub-louver of the present invention.
Figure 16:
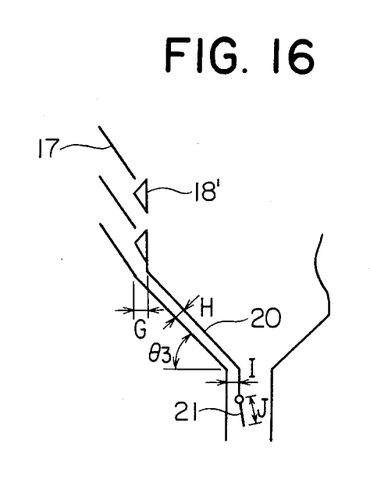
FIG. 16 is a partial view of a partition plate provided to the triangular type sub-louver of the present invention.

FIG. 11 and FIG. 16 each show the details from the lower end of the sub-louver at the inlet side to the discharge port. The dimensions of the each part are summarized below:

|  | $\theta_3$ | G (mm) | H (mm) | I (mm) | J (mm) |
|---|---|---|---|---|---|
| FIG. 11 | 60° | 125 | 108 | 70 | 150 |
| FIG. 16 | 63° | 115 | 100 | 100 | 150 |

Figure 12:
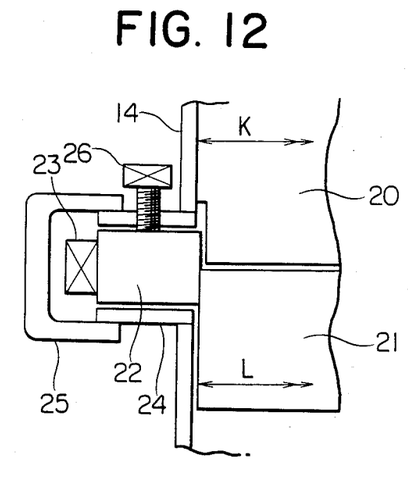
FIG. 12 is a cross-sectional view of the partition plate provided to the sub-louver of the present invention and a rotary plate provided to the partition plate.

FIG. 12 is a partially enlarged cross-sectional view of the lower end of partition plate 20 and the revolving mechanism of rotary partition plate 21. Rotary partition plate 21, rotary shaft 22 and nut 23 are integral and revolve together. In addition, outer cylinder 24 and 25 are provided as a cover for preventing leakage of a gas from casing 14. Rock bolt 26 is provided to control the revolution of rotary shaft 22. K=155 mm and L=153 mm.

In the sub-louver as shown in FIG. 9, FIG. 10 and FIG. 11, a porous or perforated plate can be used as the vertical louver board 19 so as to increase and homogenize the flowing area of a gas and to lower the pressure loss of a gas.

Comparison of the moving bed reactor provided with a sub-louver according to the present invention with a sub-louver free moving bed reactor of the prior art was carried out so as to form test results. In the case of the sub-louver free reactor, the pressure loss in the reactor became too excessive to be operated normally after 200-300 hours. At that time, the operation was stopped and the reactor was examined and it was found that a thick dust layer was formed at the upstream side of the non-moved granular material on the louver board at the inlet side. Also reaction products had grown on the inside of the louver forming masses in which only several gas flowing holes were made.

In the case of the reactor provided with the sub-louver of the present invention, in which the flow quantity of the granular material in the sub-louver part was in a proportion of about 10%, on the other hand, the pressure loss in the reactor rose slightly for about 50 hours from the start of the operation. Thereafter, a continuous and stable operation was carried out without a rise in pressure and a stable operation was carried out without a rise in the pressure loss. The fluctuation of the pressure loss and the test results of the reactor opened are tabulated below:

|  | Pressure Loss | State of Sub-Louver | State of Inside of Sub-Louver |
|---|---|---|---|
| No sub-louver | initial: 30 mm Aq; after 200-300 hrs: 250 mm Aq | Most part of louver gap was clogged. Thick dust layer was formed upstream. | large mass formed near louver |
| FIG. 10 (reverse V-type) | initial: 50 mm Ag; after 50 hr: 60 mm Aq; thereafter constant | free from clogging and dust layer; adhesion of products to inside of lower unit | no mass |
| FIG. 15 (triangular louver) | initial: 50 mm Aq; after 50 hr: 60 mm Aq; thereafter constant | free from clogging and dust layer; no adhesion of product | no mass |

The reactor of moving bed type according to the present invention can be applied to various conditions by controlling suitably the flow quantity of a granular material in the sub-louver part depending upon the dust concentration of a waste gas and the quantity of reaction products formed per unit time.

What is claimed is:
1. A moving bed reactor comprising:
   a gas inlet located at one side of said reactor for permitting a gas to enter said reactor;
   a gas outlet located at an opposite side of said reactor for permitting the gas to exit said reactor;

and containment means located between said gas inlet and said gas outlet and defining a flow path for a vertically disposed moving bed of granular particulate material, said containment means comprising a louver structure having a main louver and a sub-louver for separating the flow of a first portion of the granular particular material near said gas inlet from the flow to the remaining portion of the granular particulate material in said reactor, said main louver comprised of a plurality of vertically spaced first main louver boards located at said one side of said reactor and a plurality of vertically spaced second main louver boards located at said opposite side of said reactor, each of said main louver boards being inclined downwardly and inwardly from its top edge to its bottom edge towards the center of the flow path, said sub-louver comprised of a plurality of vertically spaced louver units each of which are adjacent and spaced in a direction towards the center of said flow path from a respective one of said first main louver boards, said louver units each having an inverted V-type cross-section comprised of a vertex disposed between said top and bottom edges of said first main louver boards respectively, an inclined sub-louver board extending downward and toward said first main louver boards respectively from said vertex for directing the first portion of said granular particulate material between said sub-louver and first main louver boards and a vertical sub-louver board extending downwardly from said vertex at an angle between 0 and 10 degrees from the vertical towards the center of said the flow path for directing a second portion of the granular particulate material downwardly in said reactor.

2. The moving bed reactor as claimed in claim 1 wherein said louver units further comprise a third sub-louver board extending between said inclined and vertical sub-louver boards for enclosing a space between said inclined and vertical sub-louver boards.

3. A moving bed reactor as claimed in claim 1 wherein,
said vertical sub-louver board is a perforated plate.

4. A moving bed reactor as claimed in claim 1 wherein,
said vertical sub-louver board is a porous plate.

5. A moving bed reactor as claimed in claim 1 wherein,
said inclined sub-louver board and said vertical sub-louver board extending from said vertex meet thereat at an angle between 30 and 50 degrees.

6. A moving bed reactor as claimed in claim 1 wherein,
said sub-louver units are spaced from said first main louver boards located at said one side of said reactor for directing only 5–20% of the granular particulate material flowing in the reactor between the sub-louver units and the first main louver boards.

7. The moving bed reactor as claimed in claim 1 wherein,
said reactor further comprises a bottom portion with a discharge nozzle located at said bottom portion for discharging said granular particulate material; said containment means further comprises a casing having an inside wall extending towards said discharge nozzle and;
a first partition plate extending at one end from a lowest edge of the vertical louver board of the bottom-most louver unit of said sub-louver, along and spaced from said inside wall and inside said discharge nozzle for defining a discharge path for granular particulate material flowing between said first main louver boards and said sub-louver.

8. A moving bed reactor as claimed in claim 7 wherein,
a rotary partition plate having a central shaft is attached along an opposite end of said first partition plate for controlling the discharge of the granular particular material flowing between said first main louver boards and said sub-louver.

9. A moving bed reactor as claimed in claim 8 wherein,
a second partition plate is provided intermediate said particulate bed between said sub-louver and said second main louver boards and a rotary plate is attached at the lowest end of the second partition plate; and a flow regulator is located in said particulate bed.

10. A moving bed reactor comprising:
a gas inlet located at one side of said reactor for permitting a gas to enter said reactor;
a gas outlet located at an opposite side of said reactor for permitting said gas to exit said reactor;
and containment means located between said gas inlet and said gas outlet and defining a flow path for a vertically disposed moving bed of granular particulate material, said containment means comprising a louver structure having a main louver and a sub-louver for separating the flow a first portion of the granular particulate material near said gas inlet from the flow of the remaining portion of the granular particulate material in said reactor; and
a mass of granular particulate material in said flow path,
said main louver comprised of a plurality of vertically spaced first main louver boards located at said one side of said reactor and a plurality of vertically spaced second main louver boards located at said opposite side of said reactor, each of said main louver boards being inclined downwardly and inwardly from its top edge to its bottom edge towards said particulate bed,
said sub-louver comprised of a plurality of vertically spaced louver units each of which are adjacent and spaced in a direction towards the center of said moving bed from a respective one of said first main louver boards, said louver units each having an inverted V-type cross-section comprised of a vertex disposed between said top and bottom edges of said first main louver boards respectively, and an inclined sub-louver board extending downward and toward said first main louver boards respectively from said vertex for directing said first portion of said granular particulate material between said sub-louver and first main louver boards and a vertical sub-louver board extending downwardly from said vertex at an angle between 0 and 10 degrees from the vertical towards said moving bed for directing a second portion of the granular particulate material downwardly in said reactor.

11. A moving bed reactor as claimed in claim 10 wherein,
said granular particulate material is a carbonaceous absorbent material.

* * * * *